(12) United States Patent
Chun et al.

(10) Patent No.: US 11,422,012 B2
(45) Date of Patent: Aug. 23, 2022

(54) SENSOR-CLUSTER APPARATUS

(71) Applicant: HYUNDAI MOBIS CO., LTD., Seoul (KR)

(72) Inventors: Jun Su Chun, Yongin-si (KR); Hee Chang Roh, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 319 days.

(21) Appl. No.: 16/727,720

(22) Filed: Dec. 26, 2019

(65) Prior Publication Data

US 2021/0123778 A1 Apr. 29, 2021

(30) Foreign Application Priority Data

Oct. 25, 2019 (KR) ........................ 10-2019-0134011

(51) Int. Cl.
*G01D 11/24* (2006.01)
*G01S 13/86* (2006.01)
*G01S 13/931* (2020.01)
*G01S 13/00* (2006.01)

(52) U.S. Cl.
CPC ............ *G01D 11/245* (2013.01); *G01S 13/86* (2013.01); *G01S 13/865* (2013.01); *G01S 13/867* (2013.01); *G01S 13/931* (2013.01)

(58) Field of Classification Search
None
See application file for complete search history.

(56) References Cited

U.S. PATENT DOCUMENTS

| 10,099,630 B1 * | 10/2018 | Krishnan | ............... G01S 13/931 |
| 10,302,744 B1 * | 5/2019 | Krishnan | ................ G01S 13/86 |
| 2019/0003895 A1 * | 1/2019 | Krishnan | ............... G01S 13/931 |

* cited by examiner

*Primary Examiner* — Bernarr E Gregory
(74) *Attorney, Agent, or Firm* — H.C. Park & Associates, PLC

(57) ABSTRACT

A sensor-cluster apparatus includes: sensors configured to detect and collect external environment information, the sensors including one or more kinds of sensors; a body member having one surface onto which the sensors are mounted; a case on which the body member is fixed, the case including: an inner space in which the body member is mounted; and an opening defined in one surface thereof exposing the inner space, the sensors are exposed through the opening; and a cover configured to open and close the opening of the case, wherein, the sensors are configured to be detached from the body member through the opening of the case with the body member fixed to the case.

11 Claims, 13 Drawing Sheets

SENSOR-CLUSTER APPARATUS

CROSS-REFERENCE TO RELATED APPLICATION

This application claims priority from and the benefit of Korean Patent Application No. 10-2019-0134011, filed on Oct. 25, 2019, which is hereby incorporated by reference for all purposes as if set forth herein.

BACKGROUND

Field

Exemplary embodiments relates to a sensor-cluster apparatus capable of being applied to an advanced driver assistance system (ADAS), and more particularly, to a sensor-cluster apparatus in which an individual sensor is capable of being detached when the individual sensor fails or needs to be replaced.

Discussion of the Background

With the development of technology, autonomous vehicles are rapidly developing in the vehicle fields for the convenience of living. 'Autonomous vehicle' refers to a vehicle which can be driven by itself without any operation by its driver or passengers (Article 2(1-3) of the Korean Automobile Management Act), and various technologies are being developed to enable the autonomous driving.

In particular, studies of an advanced driver assistance system (ADAS) are underway to complete autonomous driving technology.

The ADAS refers to a technology in which the vehicle itself recognizes some (or all) of a number of situations that may occur while driving and determines the recognized situations to control steering, braking, and acceleration/deceleration of the vehicle.

The ADAS is a system that encompasses systems such as an autonomous emergency braking (AEB) system by which the vehicle is decelerated or stopped by itself without the driver applying the brakes, a lane keep assist system (LKAS) that automatically adjusts steering when the vehicle leaves the lane, an around view monitor (AVM) system that visually displays the information of the vehicle surroundings, and the like.

Thus, the ADAS essentially requires sensors that are capable of detecting and grasping the surrounding environments of the vehicle.

The sensors are provided with sensors for recognizing a position of the vehicle and sensors for sensing the driving environments. An inertial measurement unit (IMU), a global positioning system (GPS), and the like are used as the sensors for recognizing the position of the vehicle. Also, a camera sensor, a lidar sensor, a radar sensor, and the like are used for detecting objects and the driving environments.

The sensors are installed in a front bumper, a radiator grill, the vicinity of a headlight, a top surface of a roof panel, a trunk lid, etc. of the vehicle, respectively, as illustrated in FIG. 1 which illustrates positions of the sensors mounted on the vehicle in accordance with the related art.

However, the sensors have a problem that the sensing function is limited depending on the external environments. For example, the camera sensor may be difficult to acquire valid data under a dark environment with no lighting or under severe weather, and the radar sensor may be deteriorated in reliability when radio waves are scattered in accordance with the environment and weather.

Therefore, there is a need for heterogeneous sensors to complement data from each other in accordance with the surrounding environments. That is, integration and convergence of different types of sensors have been required.

In order to realize the integration and convergence of such sensors, although software that controls the sensors and acquires the data is important, the necessity for physically collecting and arranging the sensors is required.

The above information disclosed in this Background section is only for enhancement of understanding of the background of the invention and, therefore, it may contain information that does not constitute prior art.

SUMMARY

Exemplary embodiments of the present invention provide a sensor-cluster apparatus which is capable of collecting and arranging heterogeneous sensors and in which the sensors are capable of being easily replaced without detaching a body member from a case.

Additional features of the invention will be set forth in the description which follows, and in part will be apparent from the description, or may be learned by practice of the invention.

According to one or more exemplary embodiments, a sensor-cluster apparatus including: sensors configured to detect and collect external environment information, the sensors including one or more kinds of sensors; a body member having one surface onto which the sensors are mounted; a case on which the body member is fixed, the case including: an inner space in which the body member is mounted; and an opening defined in one surface thereof exposing the inner space, the sensors are exposed through the opening; and a cover configured to open and close the opening of the case, wherein, the sensors are configured to be detached from the body member through the opening of the case with the body member fixed to the case.

The sensors may includes: a camera sensor disposed in the inner space of the case facing the opening, the camera sensor configured to recognize an object in a visible region; an infrared sensor disposed in the inner space of the case facing the opening, the infrared sensor being configured to recognize an object in an infrared region; a lidar sensor disposed in the inner space of the case facing the opening, the lidar sensor configured to map a distance from an object by emitting an optical pulse and detecting a carrier signal reflected from the object; and a radar sensor disposed in the inner space of the case facing the opening, the radar sensor configured to map a distance from the object by emitting electromagnetic waves and detecting the carrier signal reflected from the object.

Each of the camera sensor, the infrared sensor, the lidar sensor, and the radar sensor may include a male screw thread disposed on an outer circumferential surface of one distal end, wherein the body member may includes a mounting groove, the mounting groove including a female screw thread disposed on an inner circumferential surface of the mounting groove, and wherein each of the camera sensor, the infrared sensor, the lidar sensor, and the radar sensor may be coupled to the body member by screw-coupling the male screw thread to the female screw thread.

Each of the camera sensor, the infrared sensor, the lidar sensor, and the radar sensor may include a flange disposed between both distal ends, the flange having increased diameter, wherein one distal end of each of the camera sensor, the infrared sensor, the lidar sensor, and the radar sensor may be inserted into a mounting groove defined in the body member, and wherein the sensor-cluster apparatus further may include a coupling bolt coupled to the body member passing through the flange and fixed to the body member.

The radar sensor and the camera sensor may be disposed at a center of the body member, the camera sensor being disposed above the radar sensor, and wherein the lidar sensor and the infrared sensor may be disposed at respective sides of the body member with the camera sensor and the radar sensor disposed therebetween, the infrared sensor being disposed above the lidar sensor.

The radar sensor and the camera sensor may be disposed facing perpendicular to a surface of the body member, the infrared sensor may be disposed facing angled at an angle in the range of equal to or greater than 20 degrees to equal to or less than 70 degrees from the camera sensor, and the lidar sensor may be disposed facing angled at an angle in the range of equal to or greater than 20 degrees to equal to or less than 70 degrees from the radar sensor.

The cover may include a material through which infrared rays, visible light, optical pulses, and electromagnetic waves may be transmittable.

The cover may be configured to open and close the opening by a sliding device, and the sliding device may include: a motor configured to axially rotate a rotation shaft; a gear assembly configured to convert rotation movement of the rotation shaft into sliding movement; and a slidable part coupled to the cover, the slidable part configured to slide by the gear assembly.

The sliding device further may include: a worm gear connected to the rotation shaft; and a worm wheel engaged with the worm.

The sliding device further may include: a pinion gear connected to the rotation shaft; and a rack engaged with the pinion.

The gear assembly may include a link work configured to convert rotation movement of a driving shaft into sliding movement of a driven shaft, and wherein the rotation shaft may be configured to rotate the driving shaft of the link work, and the driven shaft may be coupled to a sliding part.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
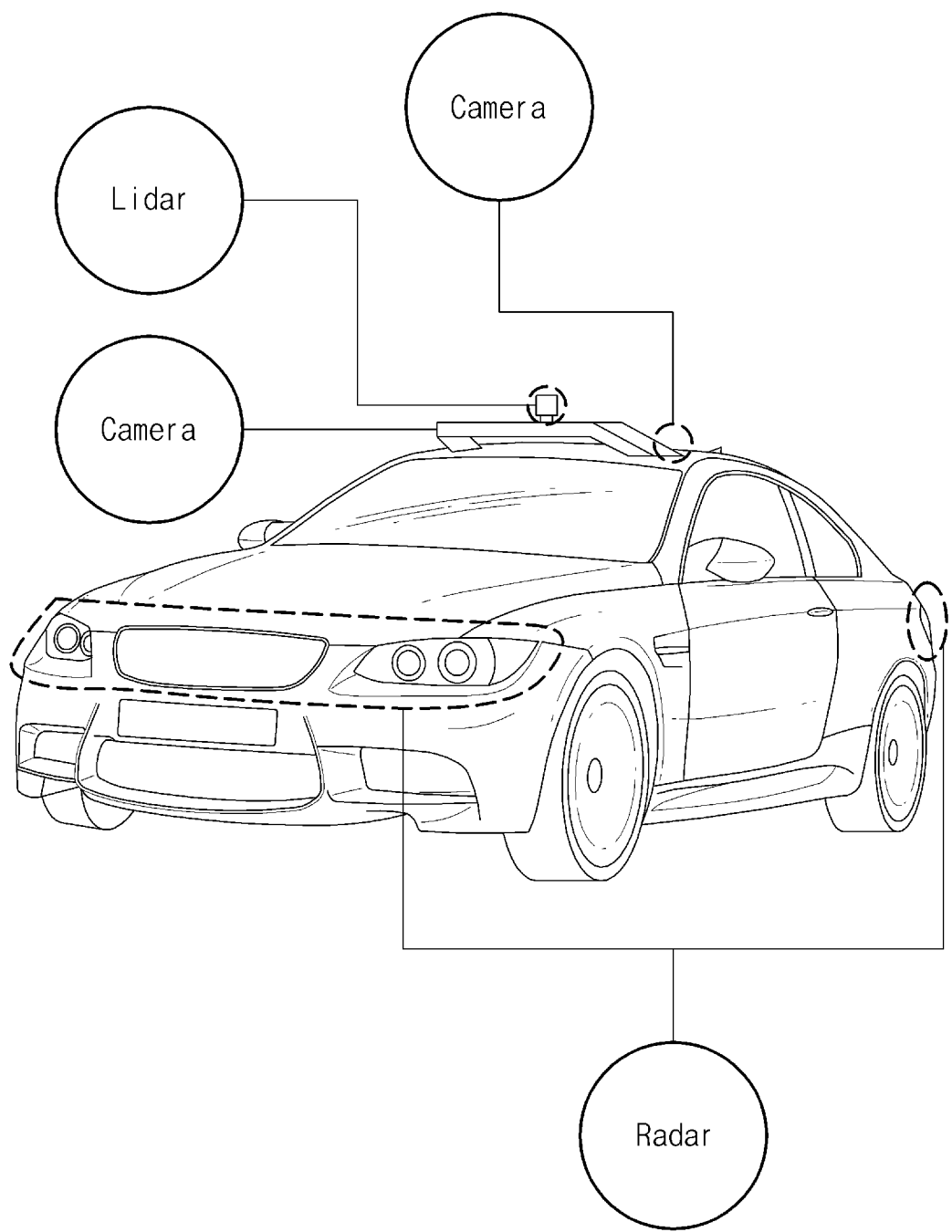
FIG. 1 is a view illustrating positions of sensors to be mounted on a vehicle in accordance to a related art.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

The present invention relates to a sensor-cluster apparatus that is capable of being mounted on an autonomous vehicle. Hereinafter, preferred embodiments of the present invention will be described in more detail with reference to the accompanying drawings.

Figure 2:
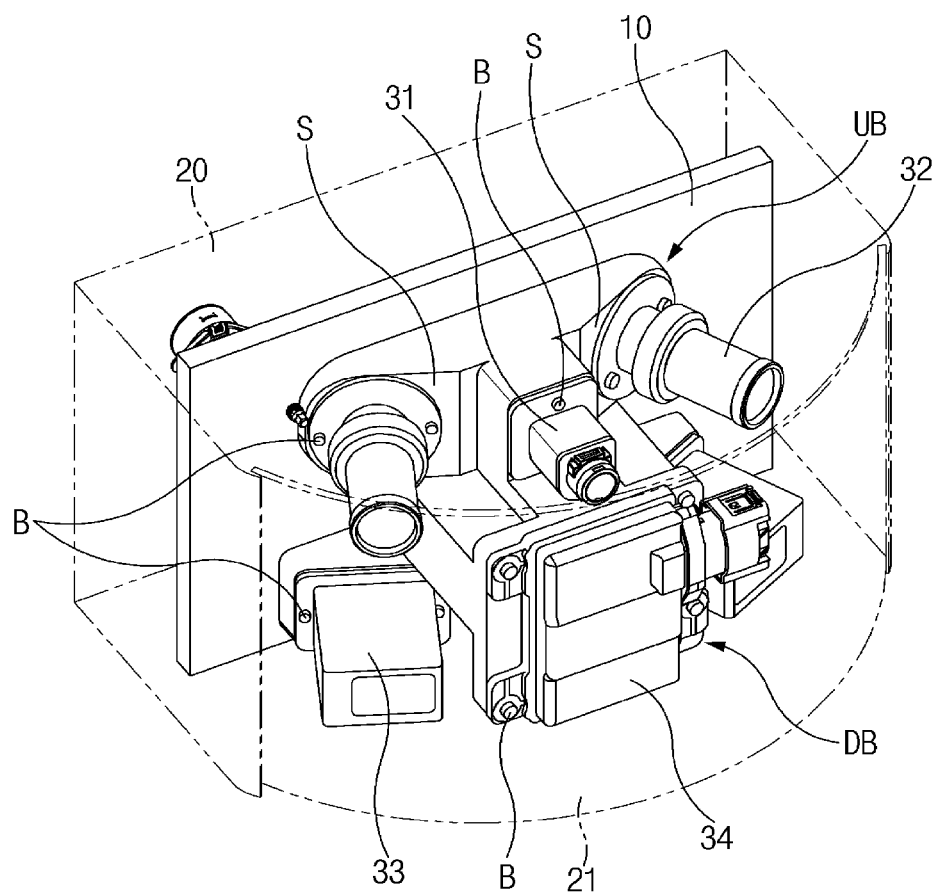
FIG. 2 is a perspective view illustrating the inside of a sensor-cluster apparatus in accordance with the present invention.
Figure 3:
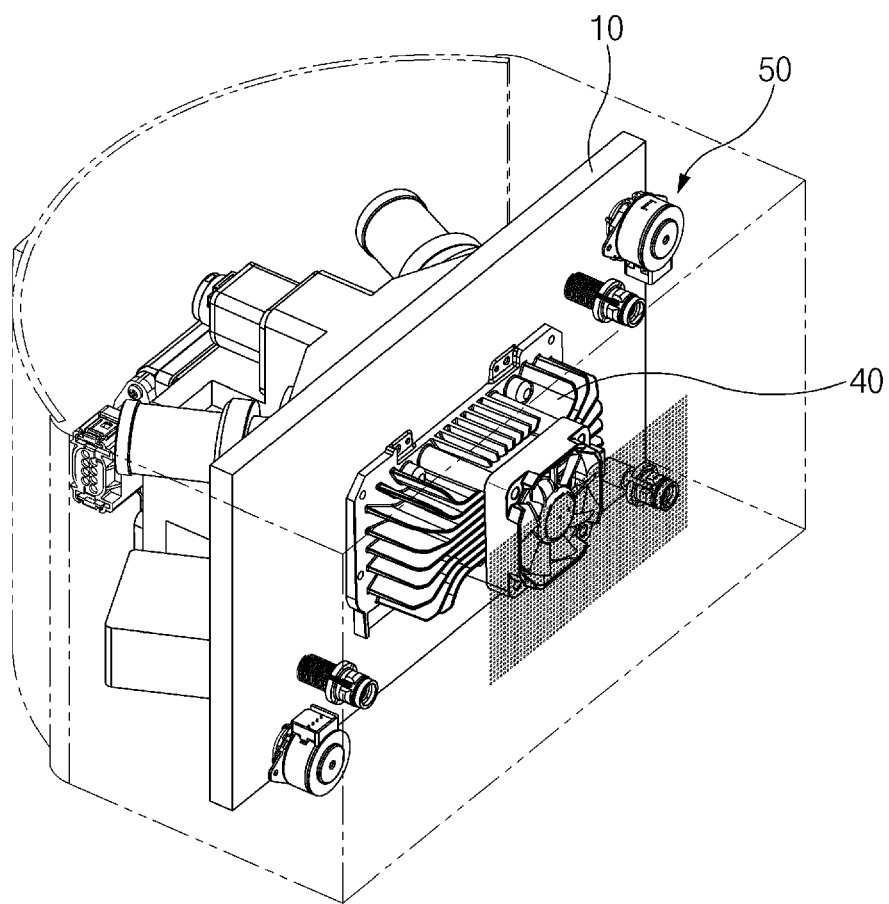
FIG. 3 is a perspective view illustrating a rear side of the sensor-cluster apparatus of FIG. 2.

FIG. 2 is a perspective view illustrating the inside of a sensor-cluster apparatus in accordance with the present invention, and FIG. 3 is a perspective view illustrating a rear side of the sensor-cluster apparatus of FIG. 2.

Referring to FIGS. 2 and 3, the sensor-cluster apparatus in accordance with the present invention includes a body member 10 on which one or more kinds of sensors 31, 32, 33, and 34 are mounted on one surface thereof. The body member 10 has a rectangular plate shape and has a structure in which a lower block DB and an upper block UB, which protrude from the surface of the body member 10, on which the sensors 31, 32, 33, and 34 are mounted, are provided. According to an exemplary embodiment, the sensors 31, 32, 33, and 34 may include a camera sensor 31, an infrared sensor 32, a lidar sensor 33, and a radar sensor 34; however, exemplary embodiments are not limited thereto, and the sensors 31, 32, 33, and 34 may include different set of sensors.

The lower block DB means a portion that protrudes from a lower side, and the upper block UB means a portion that protrudes from an upper side when the body member 10 is mounted on a case 20.

In the present invention, each of the lower block DB and the upper block UB has three flat surfaces on which the sensors 31, 32, 33, and 34 are installed.

Figure 4A:
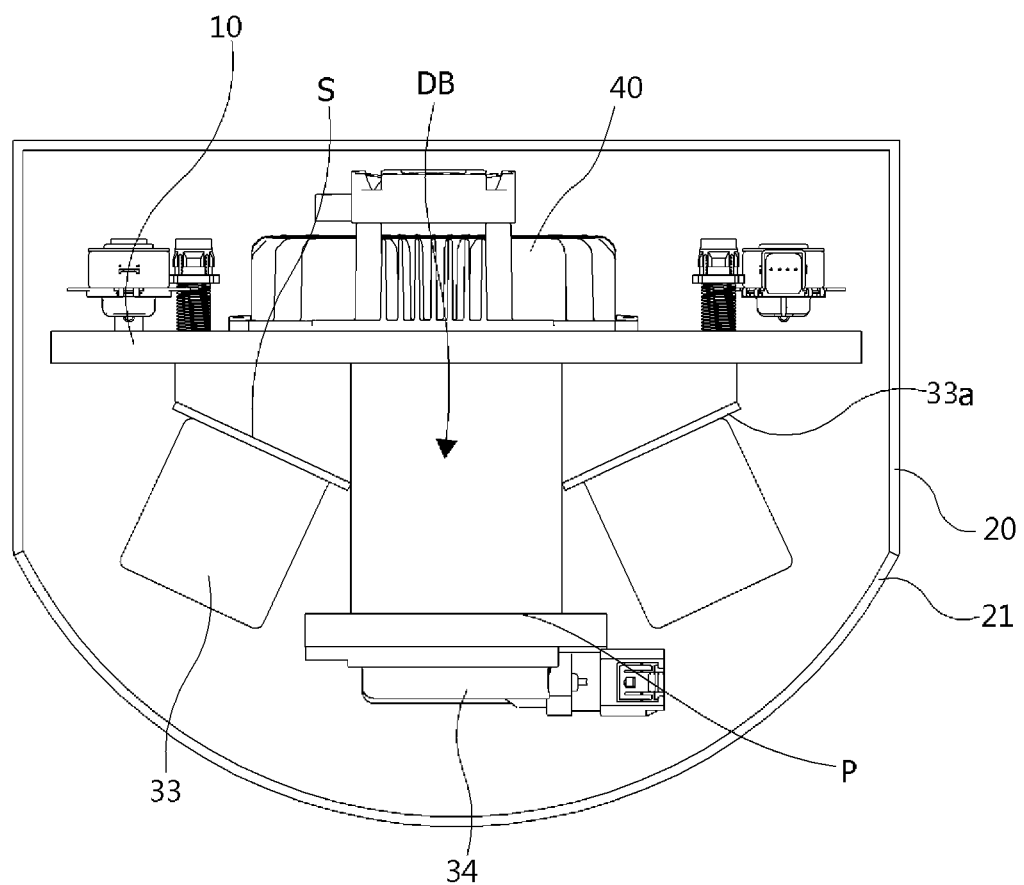
FIG. 4A is a plan view illustrating a portion at which a lower block of a body member is disposed.
Figure 4B:
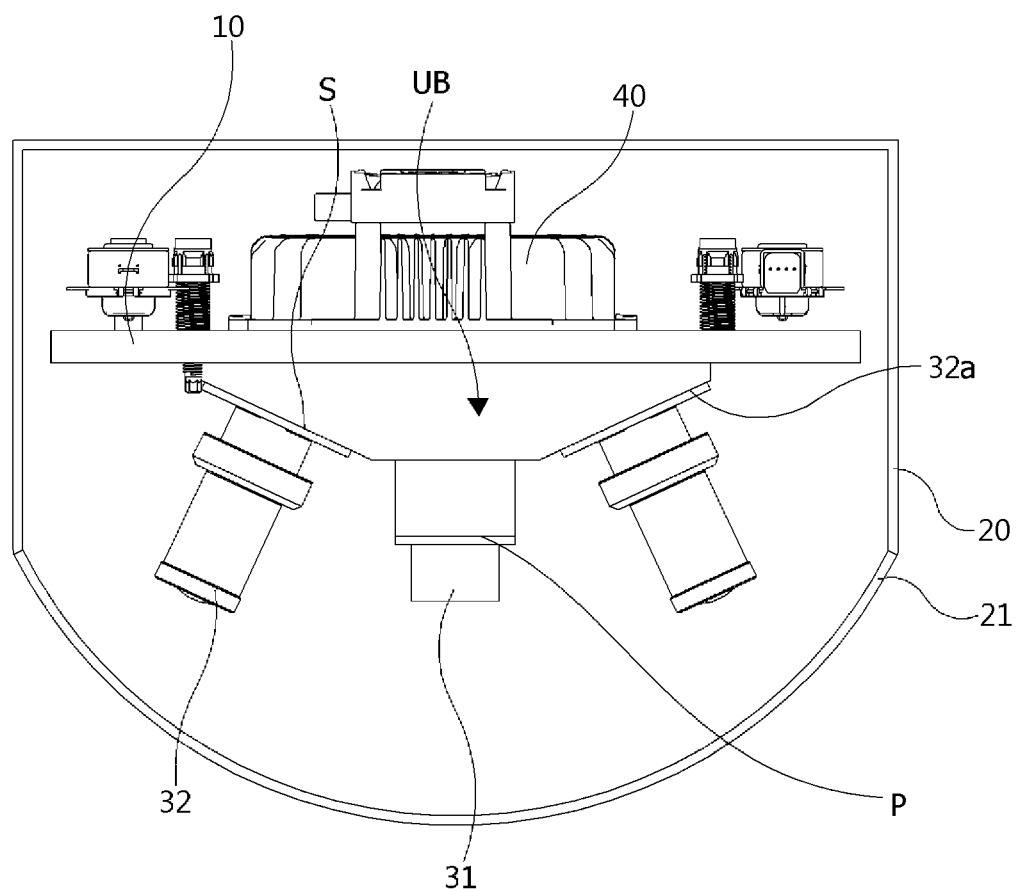
FIG. 4B is a plan view illustrating a portion at which an upper block of the body member is disposed.

That is, as illustrated in FIGS. 4A and 4B, which illustrate a portion of the body member, at which the lower block DB is disposed, and a portion of the body member, at which the upper block is disposed, each of the lower block DB and the upper block UB has a plane P at a center, which is parallel to the surface of the body member 10, and inclined surfaces S, which are respectively defined at both sides of the plane P.

Each of the upper block UB and the lower block DB has a structure in which the central plane P protrudes at the highest height, and the inclined surfaces S are inclined so that sides of the inclined surfaces S, which are adjacent to the plane P, further protrude.

Also, the upper block UB and the lower block DB may have different protruding degrees and areas of the planes P and the inclined surfaces S. This may vary depending on sizes of the corresponding sensors 31, 32, 33, and 34 to be installed. According to the exemplary embodiments, the infrared sensor 32 may be disposed facing angled at an angle in the range of equal to or greater than 20 degrees to equal to or less than 70 degrees from the camera sensor 31, and the lidar sensor 33 may be disposed facing angled at an angle in the range of equal to or greater than 20 degrees to equal to or less than 70 degrees from the radar sensor 34.

Although the plane P defined on the lower block DB has an area greater than that of the plane P defined on the upper block UB and protrudes more than the lower block DB in FIGS. 4A and 4B, the protruding degree and the protrusion area are not limited thereto. That is, the protruding degree and the protrusion area may vary depending on a size and shape of the sensor and requirements of the sensor of the sensor.

Also, the sensor-cluster apparatus of the present invention includes a case in which the body member 10 is mounted.

The case 20 has a cylindrical shape having an inner space that is sufficient so that the body member 10 is capable of being mounted and moving within a predetermined range. Also, the case 20 has an opening defined on one side, through which the inside and the outside of the case communicate with each other.

The case has a structure in which each of a rear side of the opening and both side surfaces thereof has a rectangular shape, and each of top and bottom surfaces has a rectangular shape of which a central portion is rounded to convexly protrude along an edge in which the opening defined, with reference to FIG. 2. Thus, the opening is defined in a curved shape in the case 20.

Figure 5:
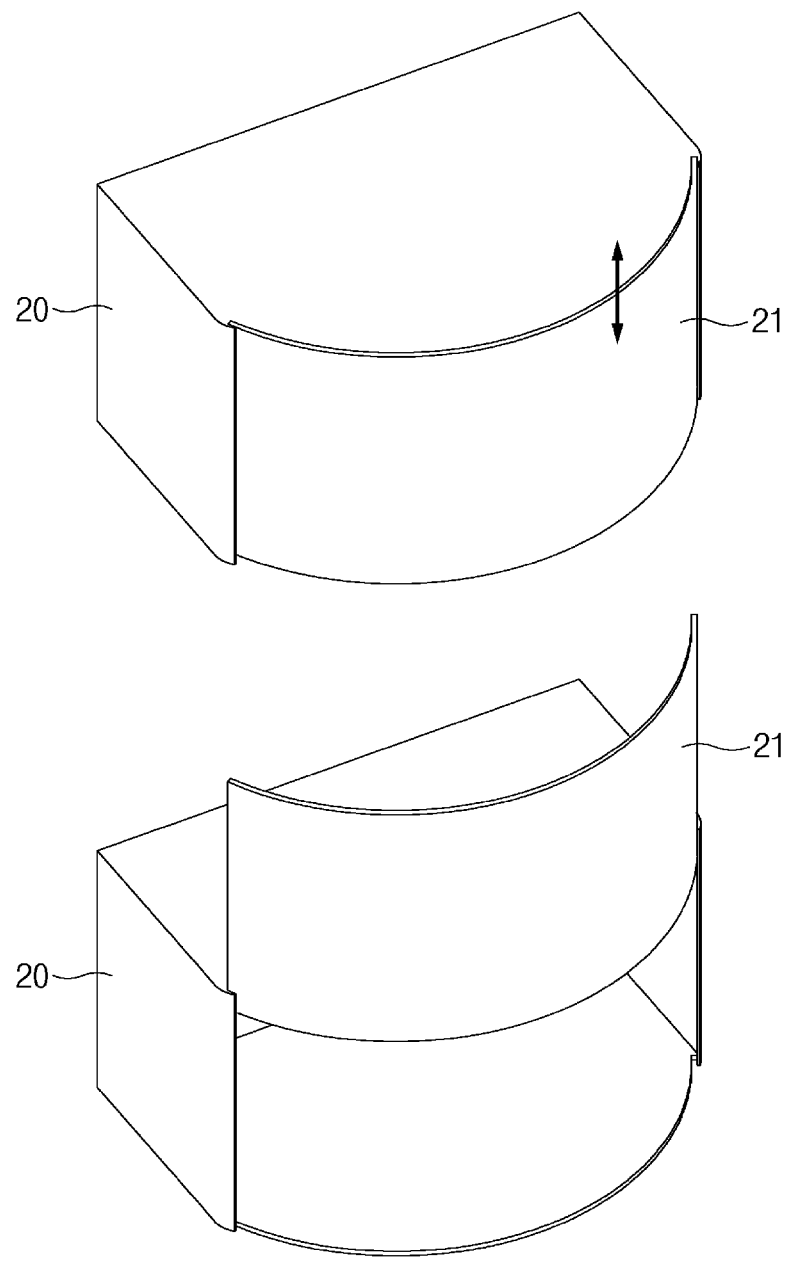
FIG. 5 is a perspective view illustrating a closed state (upper picture) and an opened state (a lower picture) of the cover by coupling the cover to the case.

Also, a cover 21 is coupled to the case 20 to cover the opening. As illustrated in FIG. 5, which illustrates a closed state (upper picture) and an opened state (a lower picture) of the cover 21 by coupling the cover to the case 20, when the cover 21 is slid vertically on the case 20 so as to be opened and closed. As a result, the cover 21 may be closed to prevent or suppress rainwater, dust, foreign matters, etc. from being introduced into the case 20 and be opened so that the sensors 31, 32, 33, and 34 and the body member 10 are detached. Also, the cover 21 may be selectively opened in accordance with determination of the control device, such as a case in which foreign matters are attached to the front surface of the cover 21 to cause a sensing error.

The cover 21 is manufactured by using a material having high transmittance so that infrared rays, visible light, optical pulses (laser), and electromagnetic waves, which are sensed by the mounted sensors 31, 32, 33, and 34, are sensed without distortion and having an appropriate strength and durability. Also, the cover 21 may have a curved surface to minimize refraction of light.

The vertical sliding of the cover 21 may be performed by a sliding device 60 mounted inside or outside the case 20.

Figure 6A:
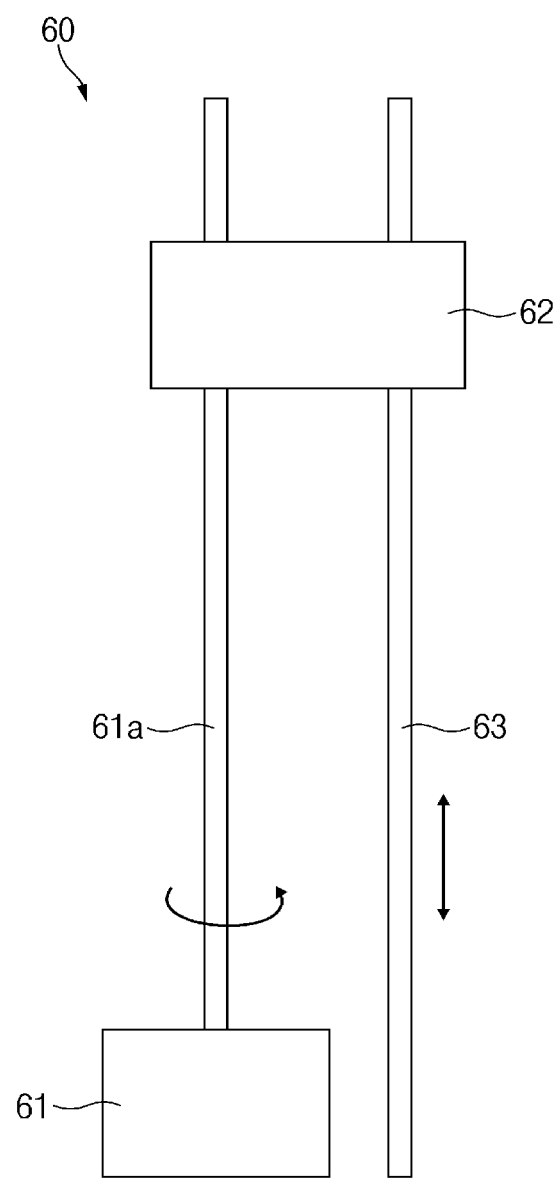
FIG. 6A is a simplified view of a sliding device in accordance with the present invention.

As illustrated in FIG. 6A, the sliding device in accordance with the present invention includes a motor 61 for axially rotating a rotation shaft 61a, a gear assembly 62 for converting the rotation movement of the rotation shaft 61a into sliding movement, and a slidable part 63 coupled to the cover 21 so as to be slid by the gear assembly 62.

Also, the motor 61 is controlled by a controller (not shown) that supplies power to control an operation of the motor 61, and the controller is interlocked with a controller communicating with the sensors 31, 32, 33, and 34.

In the present invention, a structure that is capable of converting the rotation movement into the sliding movement may be applied to the gear assembly 62.

Figure 6B:
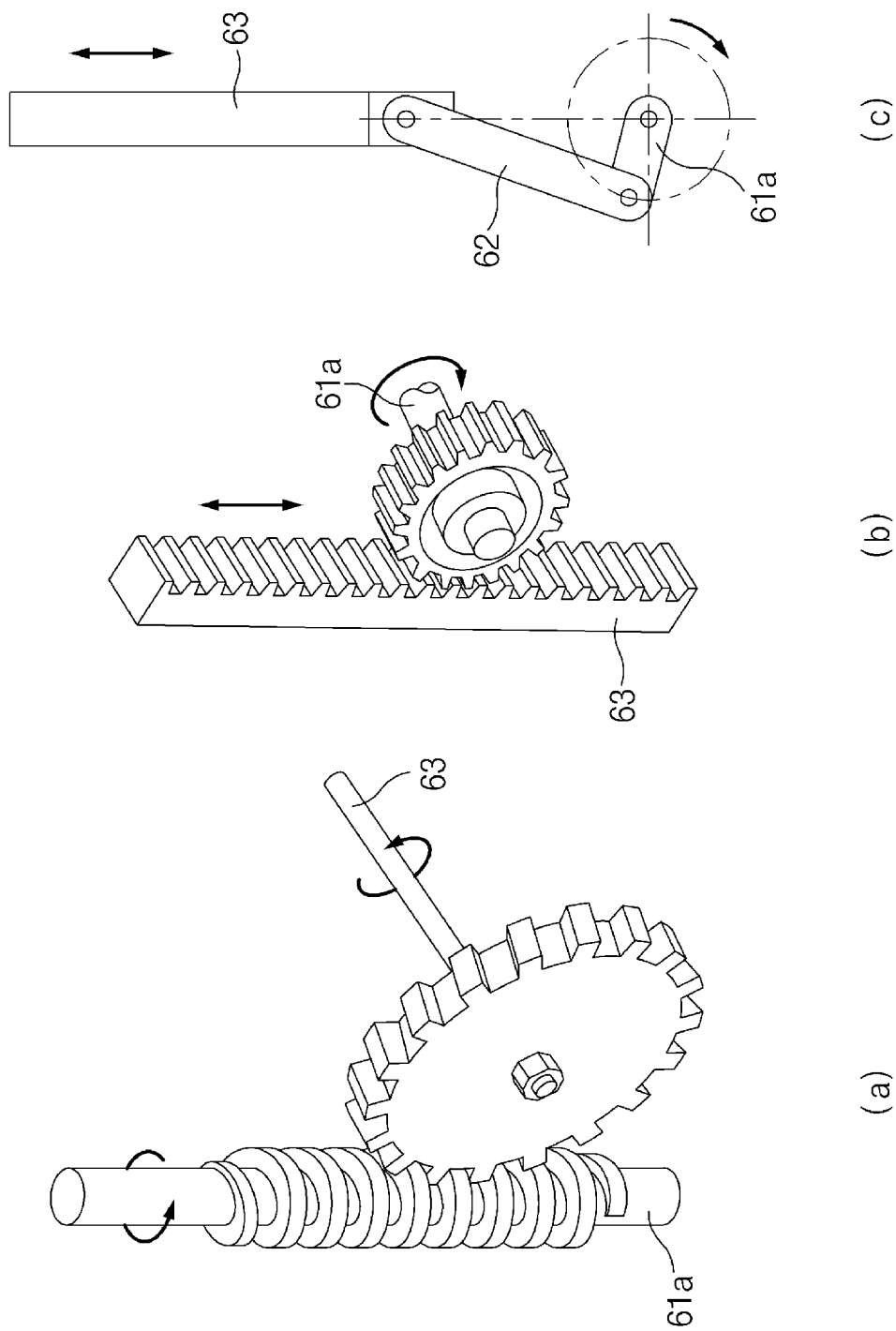
FIG. 6B is a view of (a) a worm and a worm wheel, (b) a rack and a pinion gear, and (c) a link work, which are included in a gear assembly in accordance with the present invention.

That is, as illustrated in FIG. 6B, the rotation shaft 61a of the motor is connected to a worm gear, and the gear assembly 62 may include a worm wheel engaged with the worm gear. In FIG. 6(a), the worm wheel may receive rotational force from the worm gear connected to the motor to allow the slidable part 63 to be slid through the other worm gear. Also, as illustrated in FIG. 6(b), the rotation shaft 61a of the motor may be connected to a pinion gear, and the gear assembly 62 may include a rack so that sliding movement of the rack is transmitted to the slidable part 63. As illustrated in FIG. 6(c), when the rotation shaft 61a of the motor rotates a driving shaft of a link work, the rotation movement may be converted into the sliding movement in a driven shaft.

Also, the present invention may include a position control device 50 that is capable of correcting distortion of the body member 10.

Figure 7A:
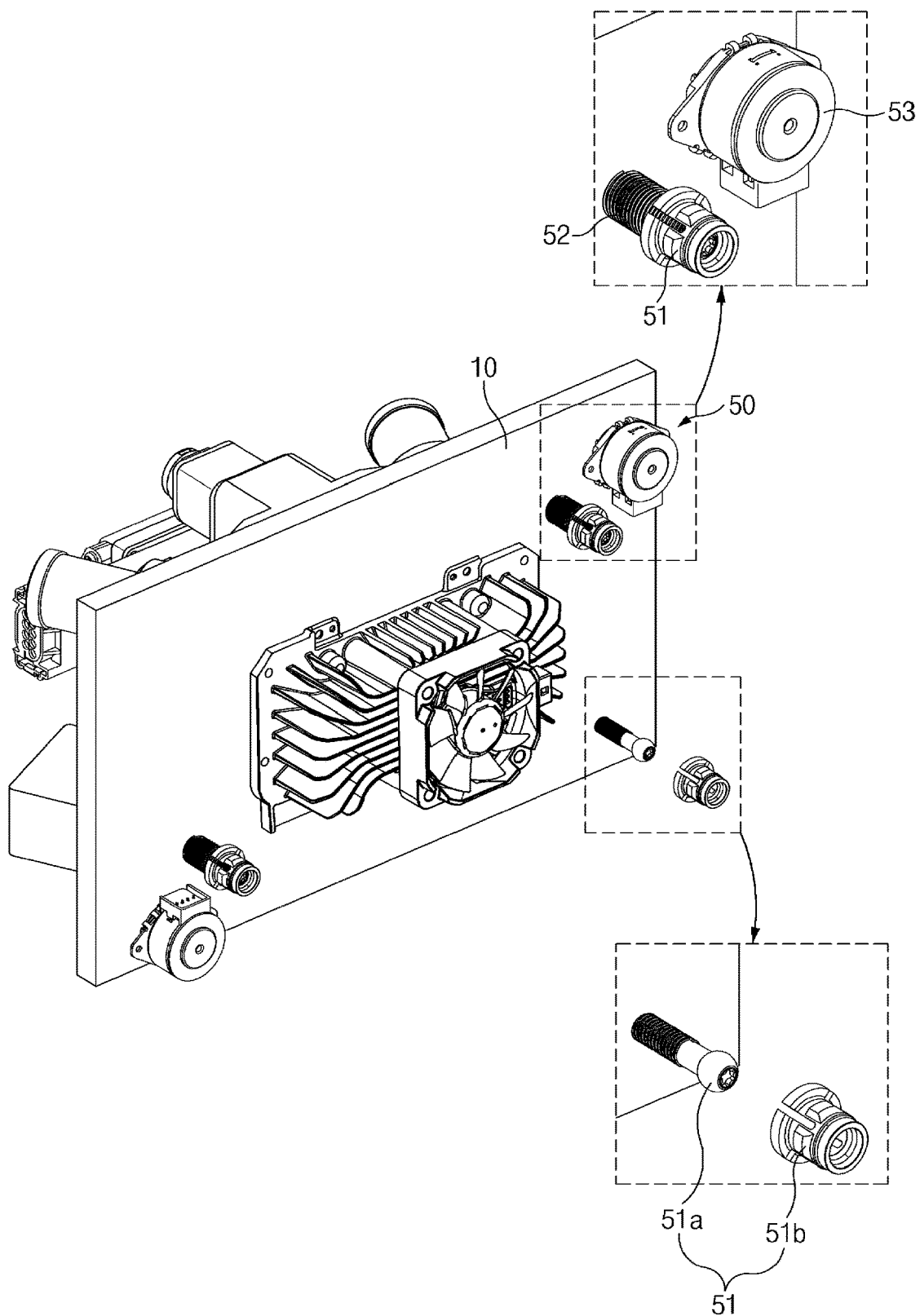
FIG. 7A is an enlarged perspective view of a position control device in accordance with the present invention.

As illustrated in FIG. 7A, the position control device 50 in accordance with the present invention includes a ball joint 51, a tension spring 52, and an actuator 53.

A ball stud 51a having a ball at an end thereof and a casing stud 51b having a casing, which accommodates the ball and allows the ball stud 51a to be freely rotated, at an end thereof are coupled to each other to provide the ball joint 51. In the present invention, an end (an opposite side of the end at which the ball is disposed) of the ball stud 51a is fixed to the body member 10, and an end (a side opposite to the end at which the casing is disposed) of the casing stud 51b is fixed to the inside of the case 20.

The tension spring 52 has one end connected to the case 20 and the other end connected to the body member 10. Here, in order to minimize a mounting space, the tension spring 52 is mounted between the ball stud 51a and the casing stud 51b to provide elastic force between the body member 10 and the case 20. That is, the tension spring 52 provide elastic force that resists a tensile load (that occurs when the body member is away from the case).

The actuator 53 is fixedly mounted inside the case 10 to provide force for pushing (pressing) the body member 10. That is, the actuator 53 overcomes the elastic force of the tension spring 52 to push the body member 10, thereby correcting the distortion of the body member 10.

Therefore, the mounting position and the mounting angle of the body member 10 are maintained by the tension spring 52. However, when the actuator 53 presses the body member 10, the actuator 53 overcomes the elastic force of the tension spring 52, and thus, the mounting position or the mounting angle of the body member 10 may be changed. That is, the mounting position and angle may be calibrated.

As illustrated in FIG. 7A, in the present invention, the ball joint 51, the tension spring 52, and the actuator 53 are mounted on a surface of the body member 10, which is opposite to the surface on which the sensors 31, 32, 33, and 34 are mounted. However, a portion of the ball joint, the tension spring, and the actuator may be mounted on the surface, on which the sensors are mounted, with a range in which an interference with each of the sensors does not occurs.

Furthermore, the actuator 53 may operate through a hydraulic device, a pneumatic device, or another power supply device. However, in the present invention, the actuator 53 operates by driving an electromagnet or a motor through the supply of current so as to enable precise position control.

Figure 7B:
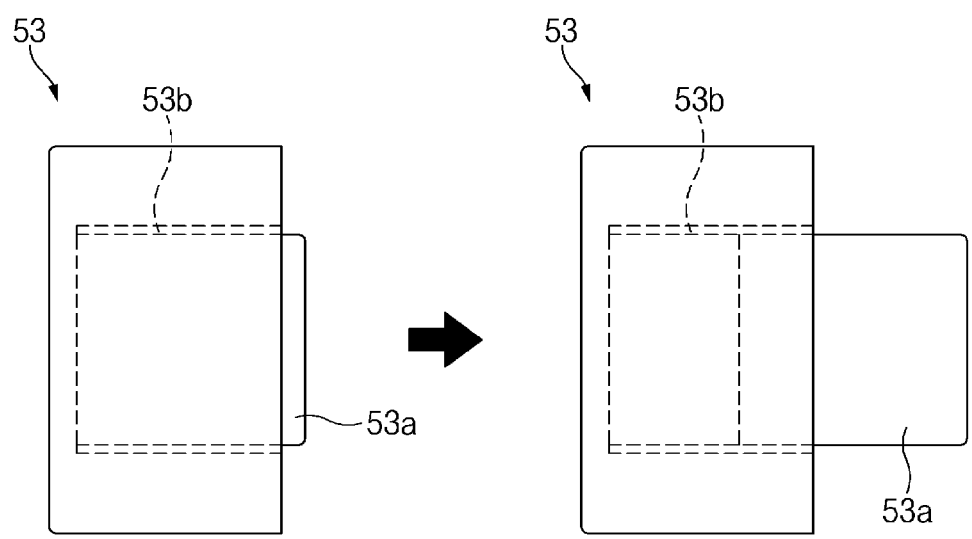
FIG. 7B is a cross-sectional view of an actuator.

That is, as illustrated in FIG. 7B, the actuator 53 includes a cylinder 53b having a hollow cylindrical shape and a piston 53a slidably mounted inside the cylinder 53b and disposed so that an end of the piston presses the body member 10. The piston 53a may be configured to be slid through the device such as the motor or the electromagnet, which is rotatable forward and reverse. That is, the piston 53a may be slid through the link work that converts the rotation force of the motor into the sliding movement or may be slid using the electromagnet.

Since the body member 10 is pushed by the piston 53a at a different spaced point while a portion of the body member 10 is fixed to the case 20, the misaligned angle may be adjusted in accordance with a protruding degree of piston 53a.

In the present invention, the ball joint 51, the tension spring 52, and the actuator 53 form one adjustment set. Here, at least two or more adjustment sets are installed at positions that are spaced apart from each other, respectively.

That is, the body member 10 has a rectangular plate shape having four vertexes. Thus, the adjustment set is disposed in the vicinity of two vertexes which are diagonally connected to each other in the body member, respectively.

As described above, since the adjustment sets are disposed in paths provided by the diagonal lines in the body member, the misalignment in various directions and the fine misalignment may be corrected by the two adjustment sets. That is, in the two adjustment sets, the protruding degree of the piston 53a may be adjusted to perform the fine correction.

Also, the ball joint 51 and the tension spring 52 may be additionally installed in the body member 10 and the case 20 in addition to the ball joint 51 and the tension spring 52, which are provided in the adjustment set, respectively.

Here, the ball joint 51 and the tension spring 52 that are additionally installed in addition to the ball joint 51 and the tension spring 52, which are provided in the adjustment set, may be installed in the vicinity of one of remaining two vertexes except for the two vertexes at which the adjustment set is disposed in the body member 10.

When each of the infrared sensor 32, the camera sensor 31, the lidar sensor 33, and the radar sensor 34 is misaligned in angle or position, each of the infrared sensor 32, the camera sensor 31, the lidar sensor 33, and the radar sensor 34 may have a function of correcting the misaligned angle or position by itself. However, when the misaligned angle or position is above a certain reference value (for example, the misaligned angle is about 3 degrees), it is impossible to correct the misaligned angle or position through the self-correction function. Therefore, when the sensors 31, 32, 33, and 34 are misaligned in position or angle by an external impact or the like, the position control device 50 provides a function of correcting the misaligned position or angle.

Furthermore, an opposite surface of the body member is provided as a whole plane. As illustrated in FIG. 3, screw grooves may be additionally punched as many as the size and number, in which a cooling device 40 and a position control device 50 that will be described later are capable of being coupled to each other, and wires connected to the mounted sensors 31, 32, 33, and 34 and electronic components may be additionally mounted.

In the present invention, the sensors mounted on the body member includes a camera sensor 31, an infrared sensor 32, a lidar sensor 33, and a radar sensor 34.

The camera sensor 31 is disposed within the case 20 so that a lens faces the opening and is configured to recognize an object in a visible region. The camera sensor 31 may include at least one lens to provide a three-dimensional image. Also, when the vehicle is driven, the camera sensor 31 may provide information for identifying traffic signs, detecting blind spots, and recognizing lane departure, pedestrians, and front objects.

The infrared sensor 32 is also disposed within the case 20 so that a lens faces the opening and is configured to recognize an object in an infrared region. The infrared sensor 32 may convert an infrared rays, which are emitted from an object, into an electrical signal to provide image information. In particular, the infrared sensor 32 may provide information for recognizing objects and pedestrians in front of and around the vehicle when driven at night.

The radar sensor 34 is disposed within the case so that a portion of the radar sensor 34, at which electromagnetic waves are generated, faces the opening. The radar sensor 34 emits the electromagnetic waves to the front of the case 20 to grasp a direction, a distance, a speed, etc. of an object through the carrier signal reflected from the object. The electromagnetic waves emitted from the radar sensor 34 may not distinguish weather and day and night and thus may provide information by supplementing the camera sensor 31.

The lidar sensor 33 recognizes an object in a manner that is similar to that of the radar sensor 34, but acquires distance information using an optical pulse (laser) rather than the electromagnetic waves. That is, the lidar sensor 33 is also disposed within the case 20 so that a portion of the lidar sensor 33, from which the optical pulse is emitted, faces the opening. The lidar sensor 33 emits the optical pulse to the front of the case 20 to detect an object through a carrier signal reflected from the object, thereby mapping the distance.

Also, as illustrated in FIG. 2, one radar sensor 34, one camera sensor 31, two infrared sensors 32, and two lidar sensors 33 are mounted on the body member 10.

Here, the radar sensor 34 and the camera sensor 31 are disposed at the center (i.e., the planes of the upper block and the lower block) of the body member 10. Here, the camera sensor 31 is disposed above the radar sensor 34. Also, the lidar sensors 33 and the infrared sensors 32 are respectively disposed at both sides of the body member 10 with the camera sensor 31 and the radar sensor 34 therebetween. Here, the infrared sensors 32 are disposed above the lidar sensors 33.

That is, the radar sensor 34 having a relatively narrow elevation angle (a sensible angle in a height direction of the vehicle) and a relatively wide azimuth angle (a sensible angle in a width direction of the vehicle) is disposed below the center, and the camera sensor 31 is disposed above (above the center) the radar sensor 34. The lidar sensors 33 are disposed at both sides of the radar sensor 34, respectively, and the infrared sensors 32 are disposed at both sides of the camera sensor 31, respectively.

Since each of the lidar sensors 33 has a relatively wide elevation angle and a relatively narrow azimuth angle when compared to those of the radar sensor 34, the two lidar sensors 33 are provided. Also, each of the infrared sensors 32 has a relatively wide elevation angle like the camera sensor 31, but the two infrared sensors 32 are provided in consideration of a space and symmetry. However, only one lidar sensor 33 may be mounted as long as the azimuth angle is sufficient.

Also, in the present invention, each of the infrared sensor 32, the camera sensor 31, the lidar sensor 33, and the radar sensor 34 is detachably coupled to the body member 10. That is, when one of the sensors 31, 32, 33, 34 needs to be replaced, only the corresponding sensor may be detached from the body member 10 without detaching the body member 10 from the case 20.

Figure 8:
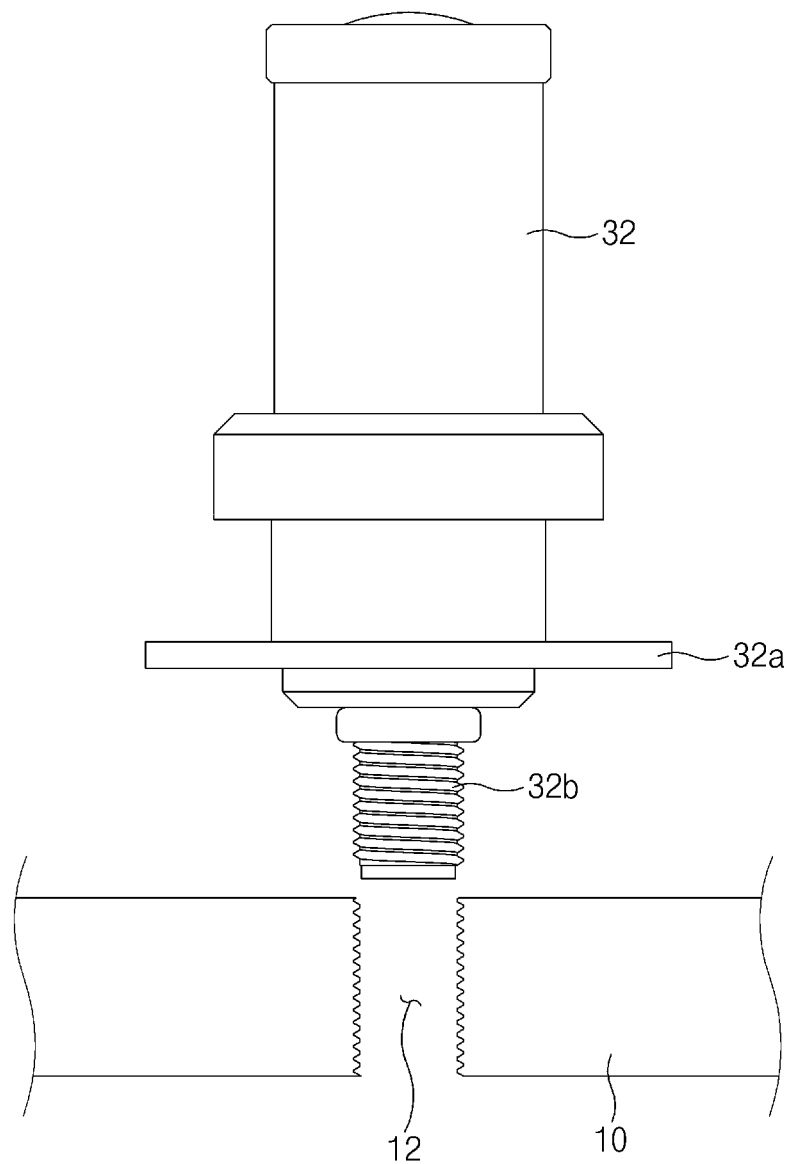
FIG. 8 is a view illustrating a state in which a male screw thread is disposed on an end of an infrared sensor, and a female screw thread is disposed on an inner circumferential surface of a corresponding mounting groove of the body member.

That is, each of the camera sensor 31, the lidar sensor 33, and the radar sensor 34 in addition to the infrared sensor 32 of FIG. 8 may have a male screw thread 32b on an outer circumferential surface of an end thereof, which is fixed to the body member 10.

Also, a mounting groove 12 may be defined in the body member 10 so that an end of the sensor is inserted, and a female screw thread engaged with the male screw thread 32b is disposed on an inner circumferential surface of the mounting groove 12. As a result, each of the sensors may be detachably mounted on the body member 10 through the screw coupling.

On the other hand, such the coupling method has the advantage of easy detachment. However, there is a possibility that unintentional loosening occurs as time goes on in the vehicle that generates an external shock and internal vibration. In order to solve such a problem, the present invention provides a structure in which the detachment is enabled, but the loosening is prevented or reduced because of the structure that is more stable than the above-described structure.

Figure 9:
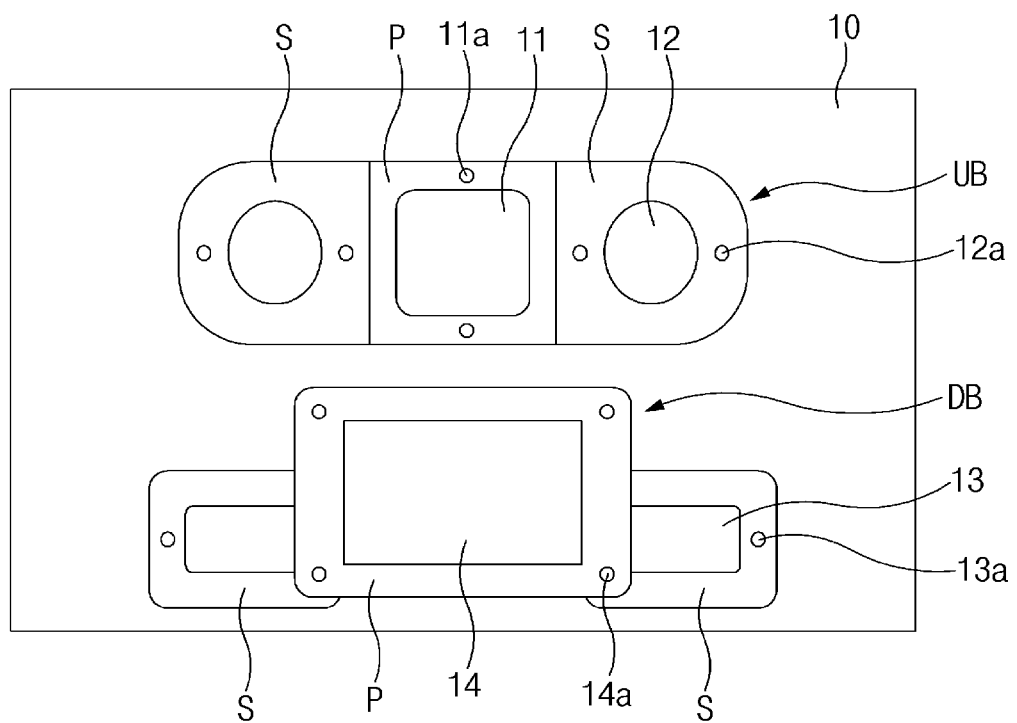
FIG. 9 is a front view illustrating a state in which a screw groove is defined in the vicinity of the mounting groove of the body member.
Figure 10:
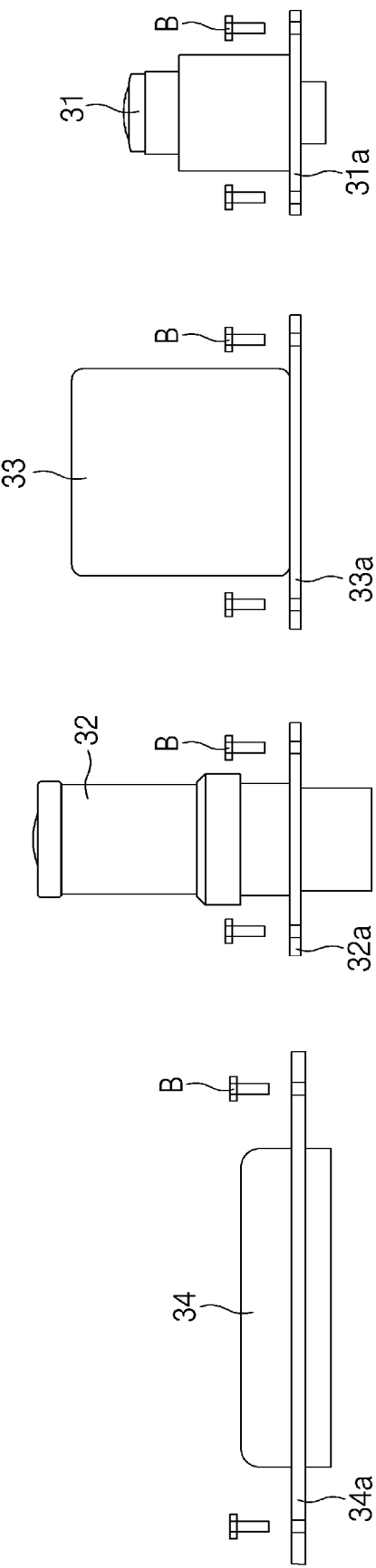
FIG. 10 is a side view illustrating each of the grooves defined in the body member of FIG. 9.

FIG. 9 is a front view illustrating a state in which the screw groove is defined in the vicinity of the mounting groove of the body member, and FIG. 10 is a side view illustrating each of the grooves defined in the body member of FIG. 9.

As illustrated in FIG. 9, mounting grooves 11, 12, 13, and 14 are defined in the planes P and the inclined surfaces S, which are defined on the upper block UB and the lower block DB, so that ends of the camera sensor 31, the infrared sensor 32, the lidar sensor 33, and the radar sensor 34 are inserted, respectively.

Also, screw grooves 11a, 12a, 13a, and 14a to which the coupling bolts B (see FIG. 2) are screw-coupled are defined in the vicinity of the mounting grooves 11, 12, 13, and 14.

The planes S and the inclined surfaces S, which are defined on the upper block UB and the lower block DB, and the mounting grooves 11, 12, 13, and 14 and the screw grooves 11a, 12a, 13a, and 14a are determined in shape and size in accordance with sizes of the sensors 31, 32, 33, and 34 to be mounted.

Also, flanges 31a, 32a, 33a, and 34a to be seated when inserted into the mounting grooves 11, 12, 13, and 14 are disposed on outer circumferential surfaces of the camera sensor 31, the infrared sensor 32, the lidar sensor 33, and the radar sensor 34, respectively. Holes communicating with the screw grooves 11a, 12a, 13a, and 14a of the body member 10 when the sensors are seated in the mounting grooves are punched in the flanges 31a, 32a, 33a, and 34a, respectively.

Thus, when the ends of the camera sensor 31, the infrared sensor 32, the lidar sensor 33, the radar sensor 34 are respectively inserted into the mounting grooves 11, 12, 13, and 14, the flanges 31a, 32a, 33a, and 34a contact the planes P or the inclined surfaces S, and the holes defined in the flanges 31a, 32a, 33a, and 34a respectively communicate with the screw grooves 11a, 12a, 13a, and 14a.

Also, the coupling bolts B are screw-coupled to the screw grooves 11a, 12a, 13a, and 14a to mount the sensors 31, 32, 33, and 34. If it is necessary to replace the sensors 31, 32, 33, and 34, the coupling bolts B of the sensors 31, 32, 33, and 34 may be loosened and separated separately.

Since the present invention having the configuration as described above has the structure in which the plurality of sensors 31, 32, 33, and 34 are mounted on the body member at once and built in the case 20, even if one or some of the sensors 31, 32, 33, and 34 fail, other sensors may provide data to compensate or supplement the data of the failed sensors. Also, since the sensors 31, 32, 33, and 34 are mounted in one place within the case 20, integrated maintenance and mounting of the sensors 31, 32, 33, and 34 may be easily performed.

In the sensor-cluster apparatus of the present invention, since the sensors 31, 32, 33, and 34 are separated and mounted individually, the sensors 31, 32, 33, and 34 may be easily replaced without separating the entire body member 10 from the case 20.

In the present invention, one radar sensor 34, one camera sensor 31, two infrared sensors 32, and two lidar sensors 33 are mounted on the body member 10. Here, the two infrared sensors may have a sensing range overlapping each other (or, the two lidar sensors may also have a sensing range overlapping each other). Thus, when one sensor fails, the other sensor may replace the failed sensor.

The cover 21 in accordance with the present invention may prevent or suppress rainwater, dust, foreign matters, and the like from being permeated into the case. In addition, the cover 21 may be made of the material that transmits the infrared rays, the visible light, the optical pulses, and the electromagnetic waves, which are transmitted and received by each of the sensors, to prevent or reduce deterioration in the sensing performance and still may be opened and closed by the sliding device when necessary.

Since the present invention having the configuration as described above has the structure in which the plurality of sensors are mounted on the body member at once and built in the case, even if one or some of the sensors fail, other sensors may provide the data to compensate or supplement the data of the failed sensors. Also, since the sensors are mounted in one place within the case, the integrated maintenance and mounting of the sensors may be easily performed.

In the sensor-cluster apparatus of the present invention, since the sensors are separated and mounted individually, the sensors may be easily replaced without separating the entire body member from the case.

In accordance with the present invention, the one radar sensor, the one camera sensor, the two infrared sensors, and the two lidar sensors may be mounted on the body member. Here, the two infrared sensors may have a sensing range overlapping each other (or, the two lidar sensors may also have a sensing range overlapping each other). Thus, when one sensor fails, the other sensor may replace the failed sensor.

The cover in accordance with the present invention may prevent or suppress rainwater, dust, foreign matters, and the like from being permeated into the case. In addition, the cover may be made of the material that transmits the infrared rays, the visible light, the optical pulses, and the electromagnetic waves, which are transmitted and received by each of the sensors, to prevent or reduce deterioration in the sensing performance and may still be opened and closed by the sliding device when necessary.

While the embodiments of the present invention have been described with reference to the specific embodiments, it will be apparent to those skilled in the art that various changes and modifications may be made without departing from the spirit and scope of the invention as defined in the following claims.

What is claimed is:

1. A sensor-cluster apparatus comprising:
   sensors configured to detect and collect external environment information, the sensors comprising one or more kinds of sensors;
   a body member having one surface onto which the sensors are mounted;
   a case that is fixed to the body member, the case comprising:
      an inner space in which the body member is disposed; and
      an opening defined in one surface thereof exposing the inner space, the sensors being exposed through the opening; and
   a cover configured to open and close the opening of the case,
   wherein, the sensors are configured to be detached from the body member through the opening of the case with the case fixed to the body member,
   wherein the sensors comprise:
      a camera sensor disposed in the inner space of the case facing the opening, the camera sensor configured to recognize an object in a visible region;
      an infrared sensor disposed in the inner space of the case facing the opening, the infrared sensor being configured to recognize an object in an infrared region;
      a lidar sensor disposed in the inner space of the case facing the opening, the lidar sensor configured to map a distance from an object by emitting an optical pulse and detecting a carrier signal reflected from the object; and
      a radar sensor disposed in the inner space of the case facing the opening, the radar sensor configured to map a distance from the object by emitting electromagnetic waves and detecting the carrier signal reflected from the object,
   wherein each of the camera sensor, the infrared sensor, the lidar sensor, and the radar sensor comprises a male screw thread disposed on an outer circumferential surface of one distal end,
   wherein the body member comprises a mounting groove, the mounting groove comprising a female screw thread disposed on an inner circumferential surface of the mounting groove, and
   wherein each of the camera sensor, the infrared sensor, the lidar sensor, and the radar sensor is coupled to the body member by screw-coupling the male screw thread to the female screw thread.

2. The sensor-cluster apparatus of claim 1, wherein the cover comprises a material through which infrared rays, visible light, optical pulses, and electromagnetic waves are transmittable.

3. A sensor-cluster apparatus, comprising:
   sensors configured to detect and collect external environment information, the sensors comprising one or more kinds of sensors;
   a body member having one surface onto which the sensors are mounted;
   a case that is fixed to the body member, the case comprising:
      an inner space in which the body member is disposed; and
      an opening defined in one surface thereof exposing the inner space, the sensors being exposed through the opening; and
   a cover configured to open and close the opening of the case,
   wherein, the sensors are configured to be detached from the body member through the opening of the case with the case fixed to the body member,
   wherein the sensors comprise:
      a camera sensor disposed in the inner space of the case facing the opening, the camera sensor configured to recognize an object in a visible region;
      an infrared sensor disposed in the inner space of the case facing the opening, the infrared sensor being configured to recognize an object in an infrared region;
      a lidar sensor disposed in the inner space of the case facing the opening, the lidar sensor configured to map a distance from an object by emitting an optical pulse and detecting a carrier signal reflected from the object; and
      a radar sensor disposed in the inner space of the case facing the opening, the radar sensor configured to map a distance from the object by emitting electromagnetic waves and detecting the carrier signal reflected from the object,
   wherein each of the camera sensor, the infrared sensor, the lidar sensor, and the radar sensor comprises a flange disposed between both distal ends, the flange having increased diameter,
   wherein one distal end of each of the camera sensor, the infrared sensor, the lidar sensor, and the radar sensor is inserted into a mounting groove defined in the body member, and
   wherein the sensor-cluster apparatus further comprises a coupling bolt coupled to the body member passing through the flange and fixed to the body member.

4. The sensor-cluster apparatus of claim 3, wherein the radar sensor and the camera sensor are disposed at a center of the body member, the camera sensor being disposed above the radar sensor, and wherein the lidar sensor and the infrared sensor are disposed at respective sides of the body member with the camera sensor and the radar sensor disposed therebetween, the infrared sensor being disposed above the lidar sensor.

5. The sensor-cluster apparatus of claim 4, wherein the radar sensor and the camera sensor are disposed facing perpendicular to a surface of the body member, the infrared sensor is disposed facing angled at an angle in the range of equal to or greater than 20 degrees to equal to or less than 70 degrees from the camera sensor, and the lidar sensor is disposed facing angled at an angle in the range of equal to or greater than 20 degrees to equal to or less than 70 degrees from the radar sensor.

6. A sensor-cluster apparatus, comprising:
sensors configured to detect and collect external environment information, the sensors comprising one or more kinds of sensors;
a body member having one surface onto which the sensors are mounted;
a case that is fixed to the body member, the case comprising:
 an inner space in which the body member is disposed; and
 an opening defined in one surface thereof exposing the inner space, the sensors being exposed through the opening; and
a cover configured to open and close the opening of the case,
wherein, the sensors are configured to be detached from the body member through the opening of the case with the case fixed to the body member,
wherein the sensors comprise:
 a camera sensor disposed in the inner space of the case facing the opening, the camera sensor configured to recognize an object in a visible region;
 an infrared sensor disposed in the inner space of the case facing the opening, the infrared sensor being configured to recognize an object in an infrared region;
 a lidar sensor disposed in the inner space of the case facing the opening, the lidar sensor configured to map a distance from an object by emitting an optical pulse and detecting a carrier signal reflected from the object; and
 a radar sensor disposed in the inner space of the case facing the opening, the radar sensor configured to map a distance from the object by emitting electromagnetic waves and detecting the carrier signal reflected from the object,
wherein the cover comprises a material through which infrared rays, visible light, optical pulses, and electromagnetic waves are transmittable,
wherein the cover is configured to open and close the opening by a sliding device, and
the sliding device comprises:
 a motor configured to axially rotate a rotation shaft;
 a gear assembly configured to convert rotation movement of the rotation shaft into sliding movement; and
 a slidable part coupled to the cover, the slidable part configured to slide by the gear assembly.

7. The sensor-cluster apparatus of claim 6, wherein the sliding device further comprises:
a worm gear connected to the rotation shaft; and
a worm wheel engaged with the worm.

8. The sensor-cluster apparatus of claim 6, wherein the sliding device further comprises:
a pinion gear connected to the rotation shaft; and
a rack engaged with the pinion.

9. The sensor-cluster apparatus of claim 6, wherein the gear assembly comprises a link work configured to convert rotation movement of a driving shaft into sliding movement of a driven shaft, and wherein the rotation shaft is configured to rotate the driving shaft of the link work, and the driven shaft is coupled to a sliding part.

10. The sensor-cluster apparatus of claim 6, wherein the radar sensor and the camera sensor are disposed at a center of the body member, the camera sensor being disposed above the radar sensor, and wherein the lidar sensor and the infrared sensor are disposed at respective sides of the body member with the camera sensor and the radar sensor disposed therebetween, the infrared sensor being disposed above the lidar sensor.

11. The sensor-cluster apparatus of claim 10, wherein the radar sensor and the camera sensor are disposed facing perpendicular to a surface of the body member, the infrared sensor is disposed facing angled at an angle in the range of equal to or greater than 20 degrees to equal to or less than 70 degrees from the camera sensor, and the lidar sensor is disposed facing angled at an angle in the range of equal to or greater than 20 degrees to equal to or less than 70 degrees from the radar sensor.

* * * * *